(12) United States Patent
Radhakrishnan et al.

(10) Patent No.: US 7,007,972 B1
(45) Date of Patent: Mar. 7, 2006

(54) METHOD AND AIRBAG INFLATION APPARATUS EMPLOYING MAGNETIC FLUID

(75) Inventors: Ramachandran Radhakrishnan, Falls Church, VA (US); Sanjay Kotha, Falls Church, VA (US); Tirumalai S. Sudarshan, Vienna, VA (US)

(73) Assignee: Materials Modification, Inc., Fairfax, VA (US)

( * ) Notice: Subject to any disclaimer, the term of this patent is extended or adjusted under 35 U.S.C. 154(b) by 148 days.

(21) Appl. No.: 10/383,779

(22) Filed: Mar. 10, 2003

(51) Int. Cl.
*B60R 21/26* (2006.01)

(52) U.S. Cl. ............... 280/736; 280/742; 137/807; 137/909

(58) Field of Classification Search ............ 280/741, 280/742, 736, 735, 737; 137/807, 827, 909, 137/251.1, 315.03
See application file for complete search history.

(56) References Cited

U.S. PATENT DOCUMENTS

| | | | |
|---|---|---|---|
| 3,047,507 A | 7/1962 | Winslow | |
| 3,127,528 A | 3/1964 | Lary et al. | |
| 3,287,677 A | 11/1966 | Mohr | |
| 3,488,531 A | 1/1970 | Rosensweig | |
| 3,927,329 A | 12/1975 | Fawcett et al. | |
| 3,937,839 A | 2/1976 | Strike et al. | |
| 4,064,409 A | 12/1977 | Redman | |
| 4,106,488 A | 8/1978 | Gordon | |
| 4,107,288 A | 8/1978 | Oppenheim et al. | |
| 4,183,156 A | 1/1980 | Rudy | |
| 4,219,945 A | 9/1980 | Rudy | |
| 4,267,234 A | 5/1981 | Rembaum | |
| 4,268,413 A | 5/1981 | Dabisch | |
| 4,303,636 A | 12/1981 | Gordon | |
| 4,321,020 A | 3/1982 | Mittal | |
| 4,323,056 A | 4/1982 | Borrelli et al. | |
| 4,340,626 A | 7/1982 | Rudy | |
| 4,342,157 A | 8/1982 | Gilbert | |
| 4,364,377 A | 12/1982 | Smith | |
| 4,443,430 A | 4/1984 | Mattei et al. | |
| 4,452,773 A | 6/1984 | Molday | |
| 4,454,234 A | 6/1984 | Czerlinski | |
| 4,472,890 A | 9/1984 | Gilbert | |
| 4,501,726 A | 2/1985 | Schröder et al. | |
| 4,545,368 A | 10/1985 | Rand et al. | |
| 4,554,088 A | 11/1985 | Whitehead et al. | |
| 4,574,782 A | 3/1986 | Borrelli et al. | |
| 4,613,304 A | 9/1986 | Meyer | |
| 4,628,037 A | 12/1986 | Chagnon et al. | |
| 4,637,394 A | 1/1987 | Racz et al. | |
| 4,662,359 A | 5/1987 | Gordon | |
| 4,672,040 A | 6/1987 | Josephson | |
| 4,695,392 A | 9/1987 | Whitehead et al. | |

(Continued)

FOREIGN PATENT DOCUMENTS

DE  37 38 989 A1  5/1989
DE  10240530  3/2004

OTHER PUBLICATIONS

Azuma, Y. et al. "Coating of ferric oxide particles with silica by hydrolysis of TEOS", Journal of the Ceramic Society of Japan, 100(5), 646-51 (Abstract) (May 1992).

(Continued)

*Primary Examiner*—David R. Dunn
(74) *Attorney, Agent, or Firm*—Dinesh Agarwal, P.C.

(57) ABSTRACT

An airbag inflation apparatus includes a chamber for generating a gas to inflate an airbag. A valve, including a magnetic fluid and a source of magnetic field, preferably an electromagnet, is associated with the chamber for regulating the flow of the gas into the airbag. A sensor determines and feeds occupant information to the sensor.

42 Claims, 5 Drawing Sheets

U.S. PATENT DOCUMENTS

| | | | |
|---|---|---|---|
| 4,695,393 A | 9/1987 | Chagnon et al. |
| 4,721,618 A | 1/1988 | Giles et al. |
| 4,951,675 A | 8/1990 | Groman et al. |
| 4,992,190 A | 2/1991 | Shtarkman |
| 4,999,188 A | 3/1991 | Solodovnik et al. |
| 5,067,952 A | 11/1991 | Gudov et al. |
| 5,069,216 A | 12/1991 | Groman et al. |
| 5,079,786 A | 1/1992 | Rojas |
| 5,108,359 A | 4/1992 | Granov et al. |
| 5,161,776 A | 11/1992 | Nicholson |
| 5,178,947 A | 1/1993 | Charmot et al. |
| 5,180,583 A | 1/1993 | Hedner |
| 5,202,352 A | 4/1993 | Okada et al. |
| 5,207,675 A | 5/1993 | Canady |
| 5,236,410 A | 8/1993 | Granov et al. |
| 5,348,050 A | 9/1994 | Ashton |
| 5,354,488 A | 10/1994 | Shtarkman et al. |
| 5,358,659 A | 10/1994 | Ziolo |
| 5,374,246 A | 12/1994 | Ray |
| 5,427,767 A | 6/1995 | Kresse et al. |
| 5,466,609 A | 11/1995 | Siiman et al. |
| 5,493,792 A | 2/1996 | Bates et al. |
| 5,507,744 A | 4/1996 | Tay et al. |
| 5,525,249 A | 6/1996 | Kordonsky et al. |
| 5,549,837 A | 8/1996 | Ginder et al. |
| 5,565,215 A | 10/1996 | Gref et al. |
| 5,582,425 A | 12/1996 | Skanberg et al. |
| 5,595,735 A | 1/1997 | Saferstein et al. |
| 5,597,531 A | 1/1997 | Liberti et al. |
| 5,599,474 A | 2/1997 | Weiss et al. |
| 5,624,685 A | 4/1997 | Takahashi et al. |
| 5,635,162 A | 6/1997 | Fischer |
| 5,635,215 A | 6/1997 | Boschetti et al. |
| 5,645,849 A | 7/1997 | Pruss et al. |
| 5,646,185 A | 7/1997 | Giaccia et al. |
| 5,650,681 A | 7/1997 | DeLerno |
| 5,667,715 A | 9/1997 | Foister |
| 5,670,078 A | 9/1997 | Ziolo |
| 5,673,721 A | 10/1997 | Alcocer |
| 5,695,480 A | 12/1997 | Evans et al. |
| 5,702,630 A | 12/1997 | Sasaki et al. |
| 5,707,078 A | 1/1998 | Swanberg et al. |
| 5,714,829 A | 2/1998 | Guruprasad |
| 5,782,954 A | 7/1998 | Luk |
| 5,800,372 A | 9/1998 | Bell et al. |
| 5,813,142 A | 9/1998 | Demon |
| 5,900,184 A | 5/1999 | Weiss et al. |
| 5,927,753 A | 7/1999 | Faigle et al. |
| 5,947,514 A | 9/1999 | Keller et al. |
| 5,958,794 A | 9/1999 | Bruxvoort et al. |
| 5,993,358 A | 11/1999 | Gureghian et al. |
| 6,013,531 A | 1/2000 | Wang et al. |
| 6,027,664 A | 2/2000 | Weiss et al. |
| 6,036,226 A | 3/2000 | Brown et al. |
| 6,036,955 A | 3/2000 | Thorpe et al. |
| 6,039,347 A | 3/2000 | Maynard |
| 6,044,866 A | 4/2000 | Rohrbeck |
| 6,051,607 A | 4/2000 | Greff |
| 6,076,852 A | 6/2000 | Faigle |
| 6,083,680 A | 7/2000 | Ito et al. |
| 6,096,021 A | 8/2000 | Helm et al. |
| 6,136,428 A | 10/2000 | Truong et al. |
| 6,149,576 A | 11/2000 | Gray et al. |
| 6,149,832 A | 11/2000 | Foister |
| 6,167,313 A | 12/2000 | Gray et al. |
| 6,186,176 B1 | 2/2001 | Gelbmann |
| 6,189,538 B1 | 2/2001 | Thorpe |
| 6,225,705 B1 | 5/2001 | Nakamats |
| 6,266,897 B1 | 7/2001 | Seydel et al. |
| 6,274,121 B1 | 8/2001 | Pilgrimm |
| 6,299,619 B1 | 10/2001 | Greene, Jr. et al. |
| 6,312,484 B1 | 11/2001 | Chou et al. |
| 6,315,709 B1 | 11/2001 | Garibaldi et al. |
| 6,319,599 B1 | 11/2001 | Buckley |
| 6,335,384 B1 | 1/2002 | Evans et al. |
| 6,355,275 B1 | 3/2002 | Klein |
| 6,358,196 B1 | 3/2002 | Rayman |
| 6,391,343 B1 | 5/2002 | Yen |
| 6,399,317 B1 | 6/2002 | Weimer |
| 6,409,851 B1 | 6/2002 | Sethuram et al. |
| 6,443,993 B1 | 9/2002 | Koniuk |
| 6,468,730 B1 | 10/2002 | Fujiwara et al. |
| 6,475,710 B1 | 11/2002 | Kudo et al. |
| 6,481,357 B1 * | 11/2002 | Lindner et al. ............. 102/530 |
| 6,489,694 B1 | 12/2002 | Chass |
| 6,527,972 B1 | 3/2003 | Fuchs et al. |
| 6,530,944 B1 | 3/2003 | West et al. |
| 6,548,264 B1 | 4/2003 | Tan et al. |
| 6,557,272 B1 | 5/2003 | Pavone |
| 6,663,673 B1 | 12/2003 | Christensen |
| 6,666,991 B1 | 12/2003 | Atarashi et al. |
| 6,683,333 B1 | 1/2004 | Kazlas et al. |
| 6,734,574 B1 | 5/2004 | Shin |
| 6,768,230 B1 | 7/2004 | Cheung et al. |
| 6,789,820 B1 * | 9/2004 | Meduvsky et al. ......... 280/742 |
| 6,815,063 B1 | 11/2004 | Mayes |
| 6,871,871 B1 * | 3/2005 | Parizat et al. ............... 280/736 |
| 2001/0011810 A1 | 8/2001 | Saiguchi et al. |
| 2001/0016210 A1 | 8/2001 | Mathiowitz et al. |
| 2001/0033384 A1 | 10/2001 | Luo et al. |
| 2002/0045045 A1 | 4/2002 | Adams et al. |
| 2002/0164474 A1 | 11/2002 | Buckley |
| 2003/0009910 A1 | 1/2003 | Pavone |
| 2003/0216815 A1 | 11/2003 | Christensen |
| 2004/0002665 A1 | 1/2004 | Parihar et al. |
| 2004/0051283 A1 * | 3/2004 | Parizat et al. ............... 280/736 |
| 2004/0132562 A1 | 7/2004 | Schwenger et al. |
| 2004/0154190 A1 | 8/2004 | Munster |

OTHER PUBLICATIONS

Atarashi, T. et al. "Synthesis of ethylene-glycol-based magnetic fluid using silica-coated iron particle", Journal of Magnetism and Magnetic Materials, 201, 7-10 (1999).

Homola, A. M. et al., "Novel Magnetic Dispersions Using Silica Stabilized Particles", IEEE Transactions on Magnetics, 22 (5), 716-719 (Sep. 1986).

Giri, A. et al. "AC Magnetic Properties of Compacted FeCo Nanocomposites", Mater. Phys. and Mechanics, 1, 1-10 (2000).

U.S. Appl. No. 10/157,921, filed May 31, 2002.

PCT Serial No. PCT/US03/14545—Filed: May 28, 2003.

U.S. Appl. No. 10/302,962—Filed: Nov. 25, 2002.

PCT Serial No. PCT/US03/16230—Filed: Jun. 25, 2003.

Lubbe, As et al. "Clinical experiences with magnetic drug targeting: a phase 1 study with 4'-expidoxorubicin in 14 patients with advanced solid tumors", Cancer Research, vol. 56, Issue 20, 4686-4693 (Abstract) (1996).

Sako, M et al., "Embolotherapy of hepatomas using ferromagnetic microspheres, its clinical evaluation and the prospect of its use as a vehicle in chemoembolo-hyperthermic therapy", Gan to kagaku ryoho. Cancer & chemotherapy, vol. 13, No. 4, Pt. 2, 1618-1624 (Abstract) (1986).

Zahn, M. "Magnetic Fluid and Nanoparticle Application to Nanotechnology", Journal of Nanoparticle Research 3, pp. 73-78, 2001.

* cited by examiner

METHOD AND AIRBAG INFLATION APPARATUS EMPLOYING MAGNETIC FLUID

BACKGROUND OF THE INVENTION

The present invention is directed to an inflatable passenger restraint system, and more particularly to an airbag inflation apparatus and method for regulating inflation in response to occupant parameters.

An inflatable passenger restraint system, such as an airbag, deploys when sensors in a vehicle detect conditions of an impending crash. The airbag is designed to protect vehicle occupants from impact with parts of the vehicle, such as the steering wheel, dashboard, and windshield. In some cases, side airbags protect vehicle occupants from impact with the sides of the interior of the vehicle.

However, airbags often injure rather than protect vehicle occupants. For instance, airbags may inflate too rapidly and forcefully resulting in bruises, broken bones, and even death, especially in smaller adults and children. In fact, automobile manufacturers recommend that young children ride in the backseat of a vehicle away from an airbag to avoid injury and possibly death from an airbag in the event of a crash. To prevent such injuries and deaths from airbags, manufacturers have sought to control airbag inflation using valves and other means.

Mechanically controlled, pyrotechnically controlled, electronically controlled, and pressure assist valves are currently utilized in controlled inflation airbag systems. However, mechanically and pyrotechnically controlled valves are costly and complex. Electronically controlled valves have a slow response time and often require mechanical springs that further increase response time and power required. Pressure assist valves minimize time required to completely open a valve, however, they restrict the ability to rapidly close or otherwise adjust the position of the valve after opening.

Other means of regulating airbag inflation include multiple inflation containers and multiple level inflators. However, multiple level inflators are expensive to manufacture due to the need to integrate two or more stored energy devices into one inflator. Also, the entire inflator must be replaced if one stored energy device is activated.

Numerous U.S. patents disclose airbag systems utilizing valves to regulate the flow of inflation fluid into the airbag. U.S. Pat. No. 5,161,776 discloses a solenoid valve assembly that is well suited for use in motor vehicle air bag assemblies. U.S. Pat. No. 5,582,425 teaches an airbag inflation system comprising a valve mechanism including two valves. One valve opens to initiate gas flow and a second valve controls gas flow by gradually increasing the flow passage area with the movement of a movable valve member. U.S. Pat. No. 5,927,753 teaches an airbag system with a valve that is actuable to regulate flow of inflation fluid through the valve so as to vary rates at which the inflation fluid pressure increases in the protection device. The valve may be a solenoid valve. U.S. Pat. No. 5,947,514 discloses an airbag system with controlled airbag inflation through the use of a throttling valve module including pintle valves, spool valves, and other electrically controlled valves. U.S. Pat. No. 6,076,852 teaches an airbag inflation apparatus which regulates the flow of inflation fluid using a solenoid valve to control outflow area.

U.S. Pat. No. 5,707,078 teaches an air bag module with adjustable cushion inflation provided by a valve member. The valve member is moved in one direction to simultaneously increase the size of the inflation outlet into the airbag while decreasing the size of the vent outlet and is moved in another direction to simultaneously decrease the size of the inflation outlet into the airbag while increasing the size of the vent outlet. The valve member is positioned by a control unit which receives input from various sensors within the vehicle regarding such factors as ambient temperature, occupant position, occupant weight, seat belt usage, etc to produce an optimum cushion inflation based upon these factors. An electromagnet, solenoid, or other device can be used to move the valve member, however, the valve member does not incorporate a magnetic fluid. This patent differs from the present invention as the valve described in the present invention does not contain a valve member that physically moves and controls the size of the inflation outlet into the airbag, rather only the particles within the magnetic fluid change position to control the gas inflation rate into the airbag.

U.S. Pat. No. 6,036,226 discloses a "smart" airbag inflator with a piston for regeneratively pumping liquid propellant from a reservoir into a combustion chamber for ignition and combustion to generate airbag inflation gases. A magneto-rheological fluid fills a damping chamber in the piston and an electromagnet varies a magnetic field exerted on the magneto-rheological fluid. Thus, the damping force of the piston may be regulated and the damping force controls the rate of liquid propellant combustion and inflation rate of the airbag. While this patent is directed to controlling the rate of liquid propellant combustion to control the inflation rate of the airbag, the present invention controls the rate and amount of combustion gas passing between the reaction chamber and the airbag. Also, in the present invention, the rate of liquid propellant combustion always remains the same.

U.S. Pat. No. 6,039,347 discloses another airbag inflator with a pair of telescoping pistons in which liquid propellant is regneratively pumped from a reservoir into a combustion chamber for ignition and combustion to generate airbag inflation gases. Pressurization of the combustion chamber causes one piston to pressurize a hydraulic fluid chamber which causes the second piston to pressurize the liquid propellant reservoir. Again, a damping fluid such as a magneto-rheological fluid in a damping chamber of the second piston controls the rate of airbag inflation gas generation. While this patent is directed to controlling the rate of airbag inflation gas generation, the present invention controls the rate and amount of combustion gas passing between the reaction chamber and the airbag. In the present invention, the rate of airbag inflation gas generation always remains the same.

Valves employing magnetorheological (MR) fluids to control gas flow are well known in the art. Magnetorheological fluids are magnetic field responsive fluids containing magnetizable particles coated with a surfactant and dispersed in a carrier liquid. These fluids typically have been used in devices, such as dampers, shock absorbers, seals, valves and the like to provide varying stress levels controlled by an external magnetic field. The variable stress is created by magnetic coupling of the particles in the form of chains or bent wall-like structures upon interaction with an external magnetic field. As to the composition, these fluids are typically made of micron-sized particles dispersed in an engineering medium, such as hydraulic oil, mineral oil, or water, or the like.

U.S. Pat. No. 6,044,866 teaches a gas flow valve comprising at least one gas inlet, at least one gas outlet, a magnetic fluid arranged in the gas flow path such that the gas must pass trough the magnetic fluid, and a means for application of a magnetic field such as a permanent magnet or an electromagnet. The gas flow valve utilizes the change in viscosity of the magnetic fluid due to the application of a magnetic field to control the gas flow through the valve. The valve is capable of permitting partial gas flow in addition to no gas flow and full gas flow so that the gas volume flowing through the valve in accordance with the invention can be continuously adjusted. However, the patent does not suggest any applications of the valve and it is not used in a controlled airbag inflation system. Further, the patent only generally discloses that any type of magnetic fluid may be used in the valve, while in the present invention it is necessary to carefully design and produce the magnetic fluid used in the valve located between the reaction chamber and the airbag. The properties of the magnetic fluid such as viscosity and yield stress must be extremely controllable upon the application of varying degrees of a magnetic field in order to protect the passengers in the vehicle. The response time of the magnetic fluid must also be extremely fast in order to inflate the airbag during a collision.

U.S. Pat. No. 6,186,176 discloses a method and system for controlling the flow of a gaseous medium through a fluid using an electrorheologic fluid, a means of guiding the gaseous medium through the electrorheologic fluid, and a means for applying an electric field at least partially in the area of the electrorheologic fluid. The viscosity of the electrorheologic fluid is controlled by the application of the electric field thereby controlling the flow of the gaseous medium through the electrorheological fluid. The means of guiding the gaseous medium through the fluid can be a shaped container. Preferably, the gaseous medium is air. The patent also suggests that the system may be used as a control valve or an overpressure valve.

There is thus a need for an inflatable passenger restraint system with controlled airbag inflation. In the present invention, a valve employing a magnetorheological fluid to control gas flow is applied to an inflatable passenger restraint system. More specifically, the present invention provides an alternative valve means utilizing the properties of a magnetic fluid to control the inflation rate of an airbag.

BRIEF SUMMARY OF THE INVENTION

The principal object of the present invention is to provide an airbag inflation apparatus which overcomes the drawbacks associated with conventional airbag inflation apparatus.

An object of the present invention is to provide an airbag inflation apparatus which employs a magnetorheological fluid to control the flow of gas(es) between the reaction chamber and the airbag.

Another object of the present invention is to provide an airbag inflation apparatus which is simple in construction, inexpensive to manufacture, and has a faster response time to inflate the airbag during a collision.

Yet another object of the present invention is to provide an airbag inflation apparatus in which the rate of propellant combustion or inflation gas(es) generation remains the same.

Still yet another object of the present invention is to provide an airbag inflation apparatus which is reusable upon activation.

In summary, the main object of the present invention is to provide an airbag inflation apparatus which is simple in construction, inexpensive to manufacture and has a faster response time than the conventional devices. The apparatus of the invention employs a magnetorheological fluid to control or regulate the flow of inflation gas(es) between the reaction chamber and the airbag.

In accordance with the present invention, an airbag inflation apparatus includes a chamber for generating a gas to inflate an airbag. A valve, including a magnetic fluid and a source of magnetic field, preferably an electromagnet, is associated with the chamber for regulating the flow of the gas into the airbag. A sensor determines and feeds occupant information to the sensor.

BRIEF DESCRIPTION OF THE DRAWINGS

The above and other objects, novel features and advantages of the present invention will become apparent from the following detailed description of the invention, as illustrated in the drawings, in which.

DETAILED DESCRIPTION OF THE INVENTION

Figure 1:
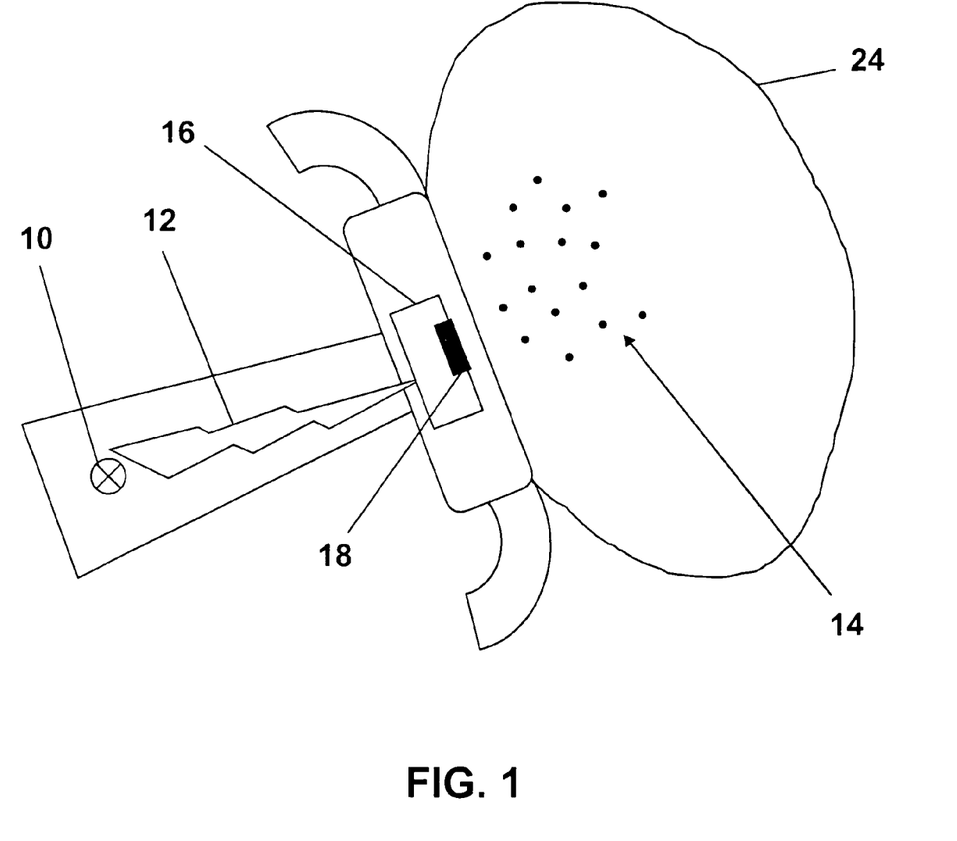
FIG. 1 is a schematic illustration of the airbag inflation apparatus of the invention.

In accordance with the present invention and as illustrated in FIG. 1, an airbag inflation apparatus includes crash sensor(s) 10, occupant weight and position sensor(s) (not shown), an igniter 12, a combustible material capable of generating airbag inflation gas(es) 14, a reaction chamber 16, a valve 18 (FIG. 2) including a magnetic fluid 20 and a source of magnetic field, preferably an electromagnet 22, and an airbag 24. The valve 18 is located between the reaction chamber 16 and the airbag 24. The valve 18 is a shaped container, such as a rectangular or cylindrical container containing the magnetic fluid 20 and surrounded by the electromagnet 22, and connects the outlet of the reaction chamber 16 to the inlet of the airbag 24. The valve is preferably made of metal or plastic, or a similar suitable material.

When crash sensor(s) 10 detects a probable collision, the igniter 12 ignites the combustible material in the reaction chamber 16 to generate airbag inflation gas(es) 14. The combustible material may be liquid propellant, ignitable gas generating material, pressurized inflation fluid, or a combination of pressurized inflation fluid and ignitable material for heating the inflation fluid. Common ignitable gas generating materials include a mixture of $NaN_3$, $KNO_3$, and $SiO_2$ or nitrocellulose based double-base powder. A pressurized inflation fluid may be air, and the ignitable material for heating the inflation fluid may be hydrogen, methane, or a mixture of hydrogen and methane. The igniter can produce an electrical impulse.

In addition, when the crash sensor(s) 10 detects a probable collision, the weight and position sensor(s) record the size and position of vehicle occupant(s). The valve 18 uses the crash data from the crash sensor(s) 10 and the occupant weight and position data from the occupant weight and position sensor(s) to control the rate at which the airbag inflation gas(es) 14 flows out of the reaction chamber 16 and into the airbag 24. In particular, based on the crash data from the crash sensor(s) 10 and the occupant weight and position data from the occupant weight and position sensor(s), the strength of the magnetic field produced by the electromagnet 22 adjusts the viscosity of the magnetic fluid 20 and the conformation of the particles 24 within the magnetic fluid 20 to control the flow rate of inflation or combustion gas(es) 14 from the reaction chamber 16 to the airbag 24.

Figure 2:
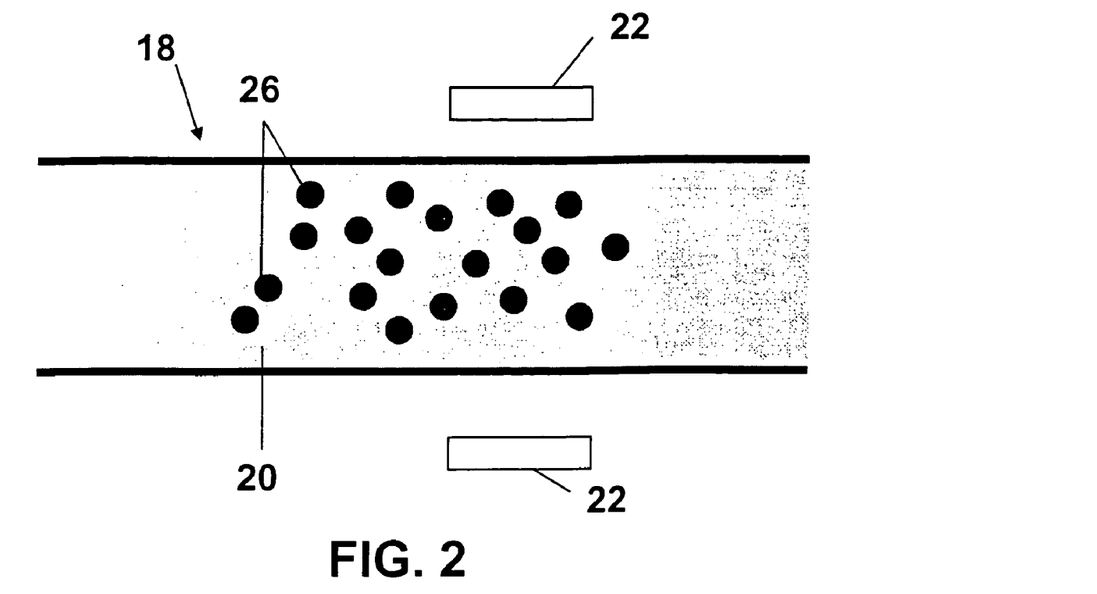
FIG. 2 is a schematic illustration of the valve of the invention, showing the conformation of the magnetic particles within the magnetic fluid not exposed to a magnetic field.

As illustrated in FIG. 2, if the crash data and occupant weight and position data indicate that the highest inflation gas flow rate is desirable, the electromagnet 22 produces no magnetic field and the particles 26 remain suspended in the magnetic fluid 20 allowing the inflation gas(es) 14 to flow freely between the reaction chamber 16 and the airbag 24.

Figure 3:
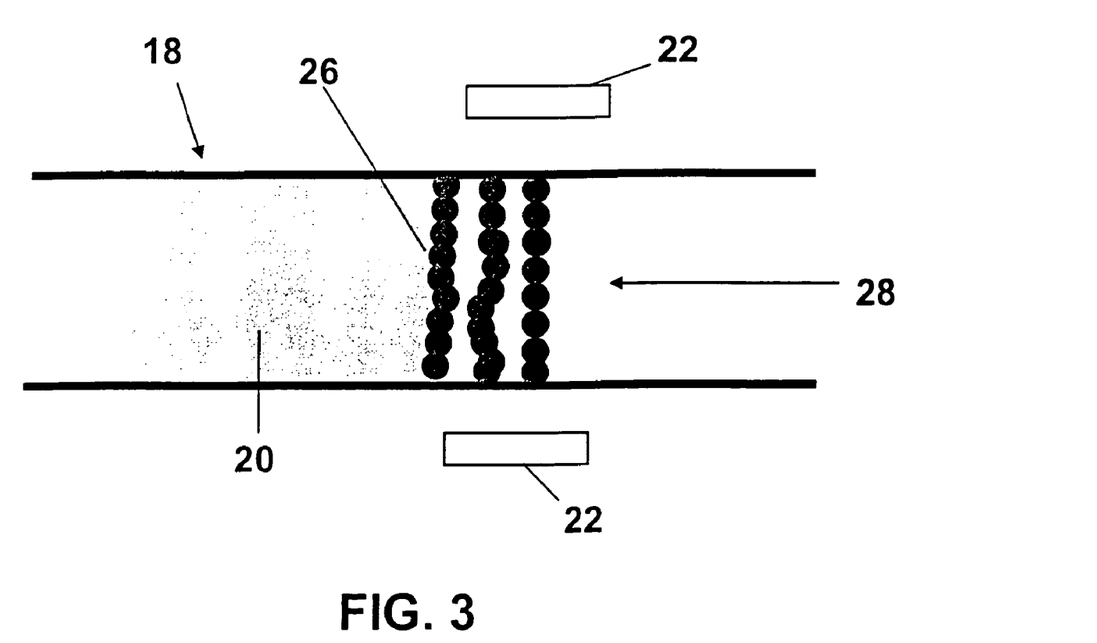
FIG. 3 is a view similar to FIG. 2, showing the conformation of the magnetic particles within the magnetic fluid exposed to a strong magnetic field.

As illustrated in FIG. 3, if the crash data and the occupant weight and position data indicate that a zero inflation gas flow rate is desirable, the electromagnet 22 produces a magnetic field causing the magnetic coupling of the particles 26 to form chains or bent wall-like structures 28 that completely block the gas flow between the reaction chamber 16 and the airbag 24. The inflation gas(es) is instead vented to the atmosphere through a relief valve (not shown) in the reaction chamber 16.

Figure 4:
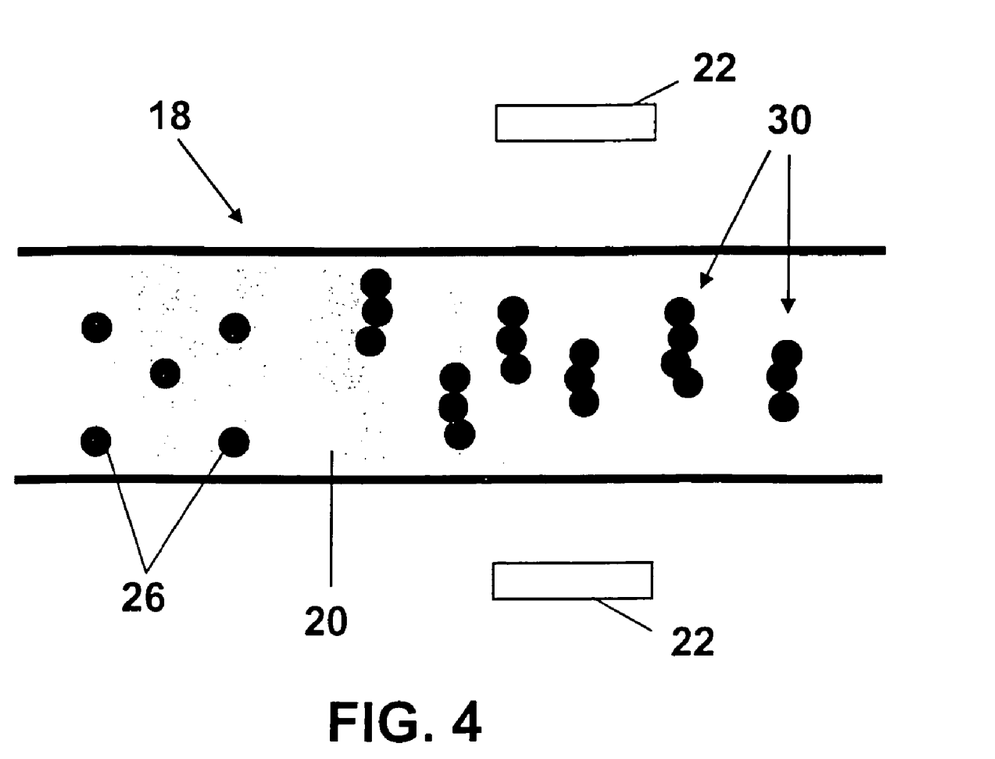
FIG. 4 is a view similar to FIG. 2, showing the conformation of the magnetic particles within the magnetic fluid exposed to an intermediate magnetic field.

As illustrated in FIG. 4, if the crash data and the occupant weight and position data indicate that the airbag 24 should inflate at some intermediate inflation gas flow rate, the electromagnet 22 produces a magnetic field of intermediate strength causing the magnetic coupling of some of the particles 26 to form short chains or bent wall-like structures 30 to partially block the gas flow between the reaction chamber 16 and the airbag 24, while the other particles 26 remain freely suspended in the magnetic fluid 20. Excess inflation gas(es) not permitted to enter the airbag 24 is vented to the atmosphere through a relief valve (not shown) in the reaction chamber. Many intermediate inflation gas flow rates are possible.

The particles in the magnetic fluid may be synthesized by various techniques, such as chemical synthesis, sol-gel, chemical co-precipitation, and microwave plasma technique. The microwave plasma technique, described in U.S. Pat. No. 6,409,851 by Sethuram (incorporated herein in its entirety by reference) is the preferred technique as it is unique in that it gives better control over particle size, shape, and purity, and can be readily extended to produce different compositions of powders. The particles include core particles coated with a surfactant and/or coating. If the particles are coated with both a surfactant and a coating, the particles would have three layers. Preferably, the coating layer is the outermost layer that covers the surfactant layer, while the surfactant layer covers the innermost layer, the particles. The particles are preferably made of a magnetic material, such as iron, iron oxide, cobalt, cobalt oxide, nickel, nickel oxide, an alloy such as steel, or a combination thereof. Preferably, the particles are made of iron, iron oxide, or a combination thereof. The composition of the particles is important as the composition controls the magnetic properties of the magnetic fluid, and therefore determines the different possible airbag inflation gas rates and amounts.

The average diameter or size of the particles is from about 1 nm to 10 $\mu$m. The preferred size of the particles is from about 1 nm to 5 $\mu$m, while the most preferred size of the particles is from about 10 nm to 1 $\mu$m. The size of the particles is important as the size controls the magnetic properties of the magnetic fluid and, therefore, determines the different possible airbag inflation gas rates and amounts.

Colloidal particles have an inherent tendency to aggregate and form clusters or agglomerate due to attractive van der Waals (vdW) forces. To stabilize the particles against these attractive forces, it is necessary to introduce a repulsive interparticle force, either by an electrostatic or by a steric means. Electrostatic stabilization utilizes the surface charge typically present on the particles, which is effective in a medium having a high dielectric constant, such as water, while in steric stabilization, a sufficiently thick layer of a polymeric or surfactant molecules is introduced around the particles. The surface layer functions as a steric barrier to prevent particle agglomeration, and thereby ensures stability of the fluid. The surface layer also prevents dissolution of the magnetic materials. This technique is preferred for the present invention. The particles are preferably coated with a surfactant and/or coating by adsorption of surfactant and/or coating molecules onto the particles in the presence of ultrasonic irradiation in a high shear field. The types of surfactants that may be utilized in the present invention include, but are not limited to, lecithin, polyethylene glycol, oleic acid, Surfynol® surfactants (available from Air Products), and a combination thereof. The types of coatings that may be utilized in the present invention include, but are not limited to, silica, gold, silver, platinum, steel, cobalt, carbon, a polymer, and a combination thereof. The polymer can be polyethylene glycol, polystyrene, dextran, or a combination thereof. Preferably, the particles are only coated with lecithin or Surfynol® surfactants.

Figure 6:
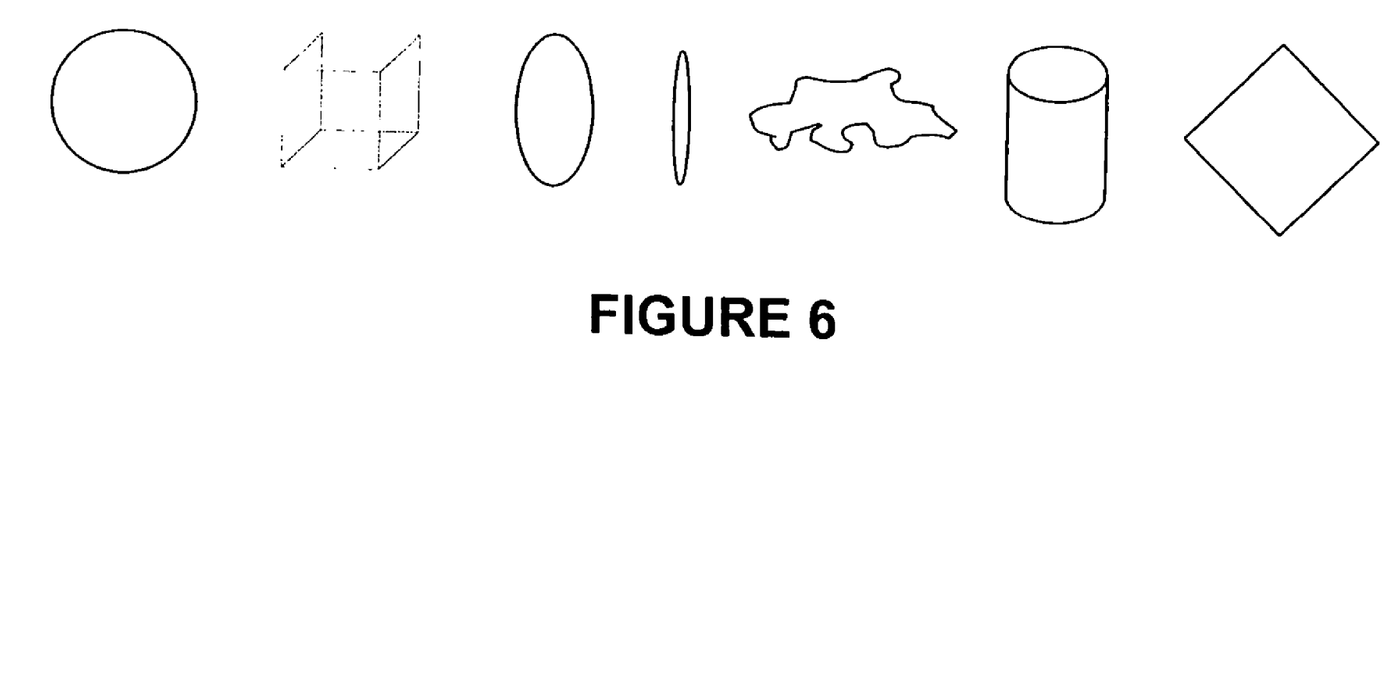
FIG. 6 illustrates various shapes of the magnetic particles for use in the present invention.

The shape of the particles is important for two reasons. First, the magnetic effect is dependent upon the particle volume fraction, which in turn is a function of the particle shape. For instance, needle shaped particles exhibit similar magnetic effect at concentrations ten times smaller than spherical particles because of larger surface area per volume. Second, the flow characteristics of the particles in a liquid medium are dependent upon their shape. The shapes utilized in this invention include, but are not limited to, spherical, needle-like, cubic, irregular, cylindrical, diamond, oval, and a combination thereof (FIG. 6). The shapes of the particles are important as the shapes control the magnetic properties of the magnetic fluid and therefore determine the different possible airbag inflation gas rates and amounts.

The particulate volume or weight fraction is also important as the magnetic character and zero field viscosity are dependent upon the particulate volume or weight fraction. Zero field viscosity refers to the viscosity of the magnetic fluid when it is not acted upon by a magnetic field and if it is too large the airbag inflation gases may not be able to diffuse through the magnetic fluid and into the airbag at a significant rate. A magnetic fluid with a larger particulate volume or weight fraction exhibits greater magnetic character and zero field viscosity than a magnetic fluid with a smaller particulate volume or weight fraction. Preferably, the particulate weight fraction is about 1% and 95%.

The particles coated with a surfactant are dispersed in a carrier liquid by high shear mixing followed by ultrasonification to form a homogenous fluid. The carrier liquid helps to retain the fluidity of the magnetic fluid when the magnetic fluid is not acted upon by a magnetic field. Carrier liquids include water based and oil based liquids, such as glycerol/water and/or mineral oil mixtures. Preferably, the carrier liquid is hydraulic oil, mineral oil, silicone oil, biodegradable oils, or a combination thereof.

EXAMPLE

Ultrafine powders of iron oxide with an average particle size of about 45–50 nm were produced using the proprietary microwave plasma chemical synthesis process described in U.S. Pat. No. 6,409,851 by Sethuram et al. Vapors of iron pentacarbonyl were fed into the plasmatron with argon/oxygen as the plasma gas. The plasma gas flow rate was about 0.003–0.0034 m$^3$/min and that of the carrier gas was about 0.0003–0.0004 m$^3$/min. The plasma temperature was about 900–950° C., the powder feed rate was about 50–60 gm/hr, and the quenching water flow rate was about 2.0–2.5 liter/min at 20° C. The reactor column diameter was about 48 mm and its length was about 10". The microwave forward power was about 4 kW, the reflected power was about 0.7 kW, and the operating frequency was about 2450 MHZ.

Standard magnetic characterization of temperature dependent susceptibility and M-H hysteresis loops were performed using a variable temperature range of about 5 K to 350 K and magnetic fields of about 0 T–5 T. The magnetic characterization tests were performed using Magnetic Property Measurement Systems from Quantum Design that uses SQUID magnetometry. The coercivity of the iron oxide nanopowders was about 176 Oe and the magnetic saturation was about 40 emu/g.

Lecithin (2 wt %-optimized) was mixed in Mobil DTE 20 series hydraulic oil using a high speed emulsifier at speeds close to 11,000 rpm. The iron oxide nanopowders were added to the oil and the mixing continued. The mixing speed was kept constant at about 11,000 rpm for a mixing time of about 30 minutes. The solids loading was about 60 wt %.

Figure 5:
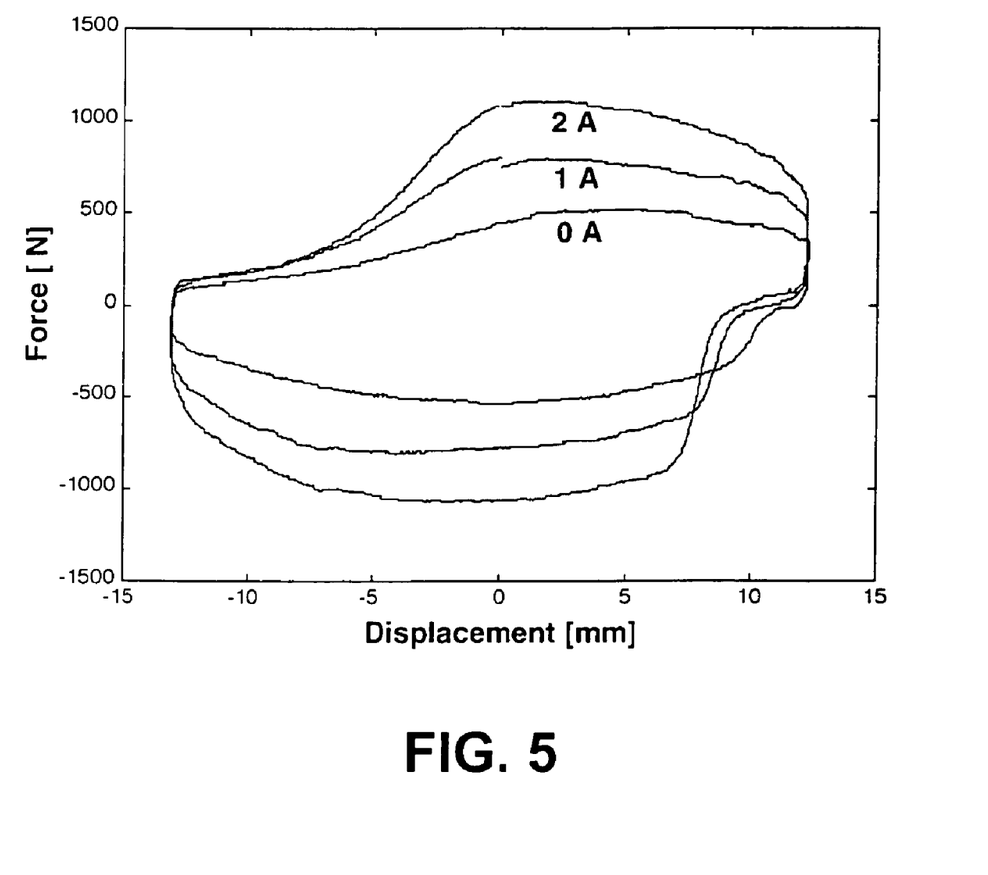
FIG. 5 shows force versus displacement hysteresis cycles at 0–2 A for a magnetic fluid with 60% solids loading of iron oxide nanoparticles with an average diameter between 45–50 nm, lecithin as the surfactant, and Mobil DTE 20 series hydraulic oil as the carrier liquid.

Force versus displacement hysteresis cycles at 0–2 A were generated using an unpressureized Rheonetics truck seat damper (available from Lord Corporation, Cary, N.C.). The force versus displacement hysteresis cycles are shown in FIG. 5. As the field increases, the area within the force vs. displacement hysteresis (or energy dissipation or damping) also increases. This indicates that there is a substantial magnetorheological effect in the fluid, which is responsible for the closing and opening of the valve in the airbag inflation apparatus of the invention.

While this invention has been described as having preferred sequences, ranges, steps, materials, or designs, it is understood that it includes further modifications, variations, uses and/or adaptations thereof following in general the principle of the invention, and including such departures from the present disclosure as those come within the known or customary practice in the art to which the invention pertains, and as may be applied to the central features hereinbeforesetforth, and fall within the scope of the invention and of the limits of the appended claims.

What is claimed is:

1. An airbag inflation apparatus, comprising:
   a) a chamber for generating a gas to inflate an airbag;
   b) a valve operably connected to said chamber for regulating the flow of the gas into the airbag;
   c) said valve including a magnetic fluid and a source of magnetic field;
   d) said magnetic fluid comprising core particles of a magnetic material;
   e) said core particles comprising first and second successive coatings; and
   f) a sensor for determining and feeding occupant information to said valve.

2. The airbag inflation apparatus of claim 1, wherein:
   a) said core particles have an average diameter of about 1 nm to 10 μm.

3. The airbag inflation apparatus of claim 2, wherein:
   a) said core particles have an average diameter of about 1 nm to 5 μm.

4. The airbag inflation apparatus of claim 3, wherein:
   a) said core particles have an average diameter of about 10 nm to 1 μm.

5. The airbag inflation apparatus of claim 1, wherein:
   a) said magnetic material is selected from the group consisting of iron, iron oxide, cobalt, cobalt oxide, nickel, nickel oxide, an alloy, and a combination thereof.

6. The airbag inflation apparatus of claim 1, wherein:
   a) said first coating comprises a coating of a surfactant; and
   b) said second coating comprises a coating of a material selected from the group consisting of a ceramic material, a metallic material, a polymer material, and a combination thereof.

7. The airbag inflation apparatus of claim 6, wherein:
   a) said surfactant is selected from the group consisting of polyethylene glycol, lecithin, oleic acid, non-ionic acetylenic diol, and a combination thereof.

8. The airbag inflation apparatus of claim 7, wherein:
   a) said second coating is selected from the group consisting of silica, gold, silver, platinum, steel, cobalt, carbon, polyethylene glycol, polystyrene, dextran, and a combination thereof.

9. The airbag inflation apparatus of claim 2, wherein:
   a) said core particles are dispersed in a carrier fluid.

10. The airbag inflation apparatus of claim 9, wherein:
    a) said carrier fluid comprises a water-based or an oil-based carrier fluid.

11. The airbag inflation apparatus of claim 9, wherein:
    a) said carrier fluid is selected from the group consisting of water, hydraulic oil, mineral oil, silicone oil, biodegradable oil, and a combination thereof.

12. The airbag inflation apparatus of claim 9, wherein:
    a) the fraction of said core particles is about 1–95% by weight of said magnetic fluid.

13. The airbag inflation apparatus of claim 2, wherein:
    a) said core particles comprise a general shape selected from the group consisting of spherical, needle-like, cubic, irregular, cylindrical, diamond, oval, and a combination thereof.

14. The airbag inflation apparatus of claim 1, wherein:
    a) the occupant information comprises weight and position data for an occupant.

15. An airbag inflation apparatus, comprising:
    a) a chamber for generating a gas to inflate an airbag;
    b) a valve operably connected to said chamber for regulating the flow of the gas;
    c) said valve including a magnetic fluid and a source of magnetic field;
    d) a first sensor for determining and feeding a probable collision information to said valve;
    e) a second sensor for determining and feeding occupant information to said valve;
    f) said magnetic fluid comprising core particles of a magnetic material;
    g) said core particles comprising first and second successive coatings; and h) wherein said source of magnetic field produces a magnetic field for regulating the flow of the gas through said valve based on the information from said first and second sensors.

16. The airbag inflation apparatus of claim 15, wherein:
a) said core particles have an average diameter of about 1 nm to 10 μm.

17. The airbag inflation apparatus of claim 16, wherein:
a) said core particles have an average diameter of about 1 nm to 5 μm.

18. The airbag inflation apparatus of claim 17, wherein:
a) said core particles have an average diameter of about 10 nm to 1 μm.

19. The airbag inflation apparatus of claim 15, wherein:
a) said magnetic material is selected from the group consisting of iron, iron oxide, cobalt, cobalt oxide, nickel, nickel oxide, an alloy, and a combination thereof.

20. The airbag inflation apparatus of claim 15, wherein:
a) said first coating comprises a coating of a surfactant; and
b) said second coating comprises a coating of a material selected from the group consisting of a ceramic material, a metallic material, a polymer material, and a combination thereof.

21. The airbag inflation apparatus of claim 20, wherein:
a) said surfactant is selected from the group consisting of polyethylene glycol, lecithin, oleic acid, non-ionic acetylenic diol, and a combination thereof.

22. The airbag inflation apparatus of claim 21, wherein:
a) said second coating is selected from the group consisting of silica, gold, silver, platinum, steel, cobalt, carbon, polyethylene glycol, polystyrene, dextran, and a combination thereof.

23. The airbag inflation apparatus of claim 16, wherein:
a) said core particles are dispersed in a carrier fluid.

24. The airbag inflation apparatus of claim 23, wherein:
a) said carrier fluid comprises a water-based or an oil-based carrier fluid.

25. The airbag inflation apparatus of claim 23, wherein:
a) said carrier fluid is selected from the group consisting of water, hydraulic oil, mineral oil, silicone oil, biodegradable oil, and a combination thereof.

26. The airbag inflation apparatus of claim 23, wherein:
a) the fraction of said core particles is about 1–95% by weight of said magnetic fluid.

27. The airbag inflation apparatus of claim 16, wherein:
a) said core particles comprise a general shape selected from the group consisting of spherical, needle-like, cubic, irregular, cylindrical, diamond, oval, and a combination thereof.

28. The airbag inflation apparatus of claim 15, wherein:
a) the occupant information comprises weight and position data for an occupant.

29. A method of regulating the flow of inflation gas into an airbag, comprising the steps of:
a) generating a gas for passing through a valve connected to an airbag;
b) determining and feeding occupant information to the valve, the valve comprising a magnetic fluid including core particles of a magnetic material, the core particles comprising first and second successive coatings;
c) producing a magnetic field based on an occupant information; and
d) applying the magnetic field to the magnetic fluid to vary the viscosity thereof for thereby regulating the flow of the gas through the valve.

30. The method of claim 29, wherein:
the value of the magnetic field can be zero or more.

31. The method of claim 29, wherein:
the occupant information comprises weight and position data for an occupant.

32. The method of claim 29, wherein:
the first coating comprises a coating of a surfactant; and
the second coating comprises a coating of a material selected from the group consisting of a ceramic material, a metallic material, a polymer material, and a combination thereof.

33. The method of claim 32, wherein:
the surfactant is selected from the group consisting of polyethylene glycol, lecithin, oleic acid, non-ionic acetylenic diol, and a combination thereof.

34. The method of claim 33, wherein:
the second coating is selected from the group consisting of silica, gold, silver, platinum, steel, cobalt, carbon, polyethylene glycol, polystyrene, dextran, and a combination thereof.

35. The method of claim 29, wherein:
the core particles are dispersed in a carrier fluid.

36. The method of claim 35, wherein:
the carrier fluid comprises a water-based or an oil-based carrier fluid.

37. The method of claim 35, wherein:
the carrier fluid is selected from the group consisting of water, hydraulic oil, mineral oil, silicone oil, biodegradable oil, and a combination thereof.

38. The method of claim 35, wherein:
the fraction of the core particles is about 1–95% by weight of the magnetic fluid.

39. The method of claim 29, wherein:
the core particles comprise a general shape selected from the group consisting of spherical, needle-like, cubic, irregular, cylindrical, diamond, oval, and a combination thereof.

40. An airbag inflation apparatus, comprising:
a) a chamber for generating a gas to inflate an airbag;
b) a valve operably connected to said chamber for regulating the flow of the gas into the airbag;
c) said valve including a magnetic fluid and a source of magnetic field;
d) said magnetic fluid comprising core particles of a magnetic material;
e) said core particles comprising a coating of a surfactant selected from the group consisting of polyethylene glycol, lecithin, oleic acid, non-ionic acetylenic diol, and a combination thereof; and
f) a sensor for determining and feeding occupant information to said valve.

41. An airbag inflation apparatus, comprising:
a) a chamber for generating a gas to inflate an airbag;
b) a valve operably connected to said chamber for regulating the flow of the gas;
c) said valve including a magnetic fluid and a source of magnetic field;
d) a first sensor for determining and feeding a probable collision information to said valve;
e) a second sensor for determining and feeding occupant information to said valve;
f) said magnetic fluid comprising core particles of a magnetic material;
g) said core particles comprising a coating of a surfactant selected from the group consisting of polyethylene glycol, lecithin, oleic acid, non-ionic acetylenic diol, and a combination thereof; and h) wherein said source of magnetic field produces a magnetic field for regulating the flow of the gas through said valve based on the information from said first and second sensors.

42. A method of regulating the flow of inflation gas into an airbag, comprising the steps of:
   a) generating a gas for passing through a valve connected to an airbag;
   b) determining and feeding occupant information to the valve, the valve comprising a magnetic fluid including core particles of a magnetic material coated with a surfactant selected from the group consisting of polyethylene glycol, lecithin, oleic acid, non-ionic acetylenic diol, and a combination thereof;
   c) producing a magnetic field based on an occupant information; and
   d) applying the magnetic field to the magnetic fluid to vary the viscosity thereof for thereby regulating the flow of the gas through the valve.

* * * * *

UNITED STATES PATENT AND TRADEMARK OFFICE
CERTIFICATE OF CORRECTION

PATENT NO. : 7,007,972 B1
APPLICATION NO. : 10/383779
DATED : March 7, 2006
INVENTOR(S) : Radhakrishnan et al.

It is certified that error appears in the above-identified patent and that said Letters Patent is hereby corrected as shown below:

On Title Page item 75 should read as:
Ramachandran Radhakrishnan, Falls Church, VA (US);
Sanjay Kotha, Falls Church, VA (US);
Tirumalai S. Sudarshan, Vienna, VA (US);
Norman M. Werely, Potomac, MD (US).

Signed and Sealed this

Twelfth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,007,972 B1  
APPLICATION NO. : 10/383779  
DATED : March 7, 2006  
INVENTOR(S) : Radhakrishnan et al.

Page 1 of 1

It is certified that error appears in the above-identified patent and that said Letters Patent is hereby corrected as shown below:

On Title Page item 75 should read as:
Ramachandran Radhakrishnan, Falls Church, VA (US);
Sanjay Kotha, Falls Church, VA (US);
Tirumalai S. Sudarshan, Vienna, VA (US);
Norman M. Wereley, Potomac, MD (US).

This certificate supersedes Certificate of Correction issued June 12, 2007.

Signed and Sealed this

Fourteenth Day of August, 2007

JON W. DUDAS  
*Director of the United States Patent and Trademark Office*